(12) United States Patent
Chen et al.

(10) Patent No.: US 8,371,508 B2
(45) Date of Patent: Feb. 12, 2013

(54) IMAGING MODULE FOR OPTICAL READER

(75) Inventors: Wenchuan Chen, Fujian (CN); Wenbin Wu, Fujian (CN); Yanpeng Geng, Fujian (CN); Ruilin Chen, Fujian (CN); Qijian Xie, Fujian (CN); Jijun Liu, Fujian (CN); Lifeng Chen, Fujian (CN); Menghong Xu, Fujian (CN)

(73) Assignee: Fujian Newland Auto-ID Technology Co., Ltd., Fuzhou, Fujian Province (CN)

( * ) Notice: Subject to any disclaimer, the term of this patent is extended or adjusted under 35 U.S.C. 154(b) by 176 days.

(21) Appl. No.: 12/969,585

(22) Filed: Dec. 15, 2010

(65) Prior Publication Data

US 2011/0139876 A1    Jun. 16, 2011

(30) Foreign Application Priority Data

Dec. 16, 2009  (CN) .......................... 2009 1 0261995
Dec. 16, 2009  (CN) .......................... 2009 1 0261996
Dec. 16, 2009  (CN) .......................... 2009 1 0265208
Dec. 16, 2009  (CN) .......................... 2009 1 0265215
Dec. 16, 2009  (CN) ...................... 2009 2 0213166 U

(51) Int. Cl.
    *G06K 7/10*        (2006.01)
(52) U.S. Cl. ..................................... 235/470
(58) Field of Classification Search .................. 235/454, 235/462.01, 472.01–472.03, 470
See application file for complete search history.

(56) References Cited

U.S. PATENT DOCUMENTS

| | | | |
|---|---|---|---|
| 5,521,366 A | 5/1996 | Wang et al. | |
| 5,780,834 A | 7/1998 | Havens et al. | |
| 5,932,860 A | 8/1999 | Plesko | |
| 6,123,263 A * | 9/2000 | Feng | 235/462.42 |
| 6,318,635 B1 * | 11/2001 | Stoner | 235/462.45 |
| 6,817,525 B2 * | 11/2004 | Piva et al. | 235/454 |
| 7,270,274 B2 | 9/2007 | Hennick et al. | |
| 7,389,926 B2 * | 6/2008 | Aoki et al. | 235/454 |
| 7,500,614 B2 | 3/2009 | Barber et al. | |

FOREIGN PATENT DOCUMENTS

CN    200956168 Y    10/2007

* cited by examiner

*Primary Examiner* — Seung Lee
(74) *Attorney, Agent, or Firm* — Cheng-Ju Chiang

(57) ABSTRACT

An imaging module includes a mounting frame, a scanning module, a lens, a number of illumination lights, a first circuit board and a second circuit board. The mounting frame has a bottom wall, a first sidewall and a second sidewall located at opposite sides of the bottom wall. The first and second walls define a receiving space which opens at a top end of the mounting frame. The second circuit board has a decoding element and is electrical connected with the first circuit board. The second circuit board covers the top end of the receiving space.

17 Claims, 15 Drawing Sheets

IMAGING MODULE FOR OPTICAL READER

BACKGROUND OF THE INVENTION

1. Field of the Invention

The present invention generally relates to optical reading devices, and more particularly to an imaging module for an optical reader.

2. Description of Related Art

Barcode is an optical machine-readable representation of data, which shows information of a target. Conventionally, barcodes represent data by the widths and the spacings of a plurality of parallel lines. Barcodes can be read by optical scanners called barcode readers, or can be scanned from an image by special software. Nowadays, barcode readers are used commercially in lots of fields such as supermarket, libraries et al.

Current available optical readers are composed by illumination elements, electronic signal processing module, image capture module and decoding circuitry that are carried by more than one circuit board. An example of such optical reader is disclosed by U.S. Pat. No. 5,780,834, which provides numerous circuit boards, including an LED board for carrying illumination LEDs, an "imaging board" carrying an image sensor and circuitry for processing signals generated from the image sensor, and a "mother board" carrying image capture and decoding circuitry. Obviously, such an optical reader with multiple circuit boards, will results in high manufacturing cost. Additionally, the whole size of the device is relatively enlarged in order to incorporate therein those multiple circuit boards. Therefore, it does not satisfy the trends of miniaturization and integration of the electronic devices.

Generally, the imaging module is deemed as an important element of the optical reader, which integrates illuminating LEDs, aiming LEDs, image sensor, and decode circuits et al. Understandably, optimizing the structure of the imaging module can reduce the size of the optical reader distinctly. China Utility Model patent No. 200956168 discloses an imaging module which has a reflection glass between the lens and the sensitive surface of the image sensor. Consequently, the length of the imaging module in the horizontal direction is shortened without changing the travel of the entering ray.

U.S. Pat. No. 7,270,274 issued on Sep. 18, 2007 discloses another kind of imaging module which includes an image capture module and a decoding module mounted on the image capture module. The image capture module includes a frame, a lens secured to the frame, a baffle plate attached to the frame from opposite sides of the frame, and a signal processing circuit. The frame is made in one-piece and has a top wall, a bottom wall and a front wall. The top and bottom walls define a receiving space therebetween. Since the top end of the receiving space is covered by the top wall, there is no more space for retaining the decoding module. The decoding module needs to be stackedly assembled on the top wall, which not only makes it difficult to position the decoding module but also increases the whole size of the imaging module.

Therefore, an improved packaging method and apparatus for packaging optical and electrical components in an optical reader is highly desired.

BRIEF SUMMARY OF THE INVENTION

An imaging module comprises a mounting frame, a scanning module, a lens, a plurality of illumination lights, a first circuit board and a second circuit board. The mounting frame has a bottom wall, a first sidewall and a second sidewall located at opposite sides of the bottom wall. The first and second walls define a receiving space which opens at a top end of the mounting frame. The scanning module and the plurality of illumination lights are located in the receiving space. The lens is located in front of the scanning module. The first circuit board electrically connected with the illumination lights. The second circuit board has a decoding element and is electrical connected with the first circuit board. The second circuit board encloses the top end of the receiving space.

An optical reader comprises a CPU board, an imaging module electrical connected with CPU board, a power module electrical connected with the CPU board and providing power for the imaging module, and a case shielding the CPU board, the imaging module and the power module. The imaging module comprises a mounting frame, a scanning module, a lens, a plurality of illumination lights, a first circuit board and a second circuit board. The mounting frame has a bottom wall, a first sidewall and a second sidewall located at opposite sides of the bottom wall. The first and second walls define a receiving space which opens at a top end of the mounting frame. The scanning module and the plurality of illumination lights are located in the receiving space. The lens is located in front of the scanning module. The first circuit board electrically connects with the illumination lights. The second circuit board has a decoding element and is electrical connected with the first circuit board. The second circuit board encloses the top end of the receiving space.

An imaging module comprises a mounting frame, a lens, a plurality of illumination lights and a decoding circuit board. The mounting frame has a bottom wall, a first sidewall and a second sidewall located at opposite sides of the bottom wall. The first and second walls define a receiving space. The lens and the plurality of illumination lights are located in the receiving space. The decoding circuit board is mounted to the mounting frame and includes a decoding circuit and an image sensor receiving signals from the lens.

BRIEF DESCRIPTION OF THE DRAWINGS

The foregoing summary, as well as the following detailed description of the preferred embodiments of the present invention, will be better understood when read in conjunction with the appended drawings. For the purpose of illustrating the invention, there is shown in the drawings, embodiments which are presently preferred. It should be understood, however, that the present invention is not limited to the precise arrangements and instrumentality shown in the attached drawings.

DETAILED DESCRIPTION OF THE PREFERRED EMBODIMENT

Figure 1:
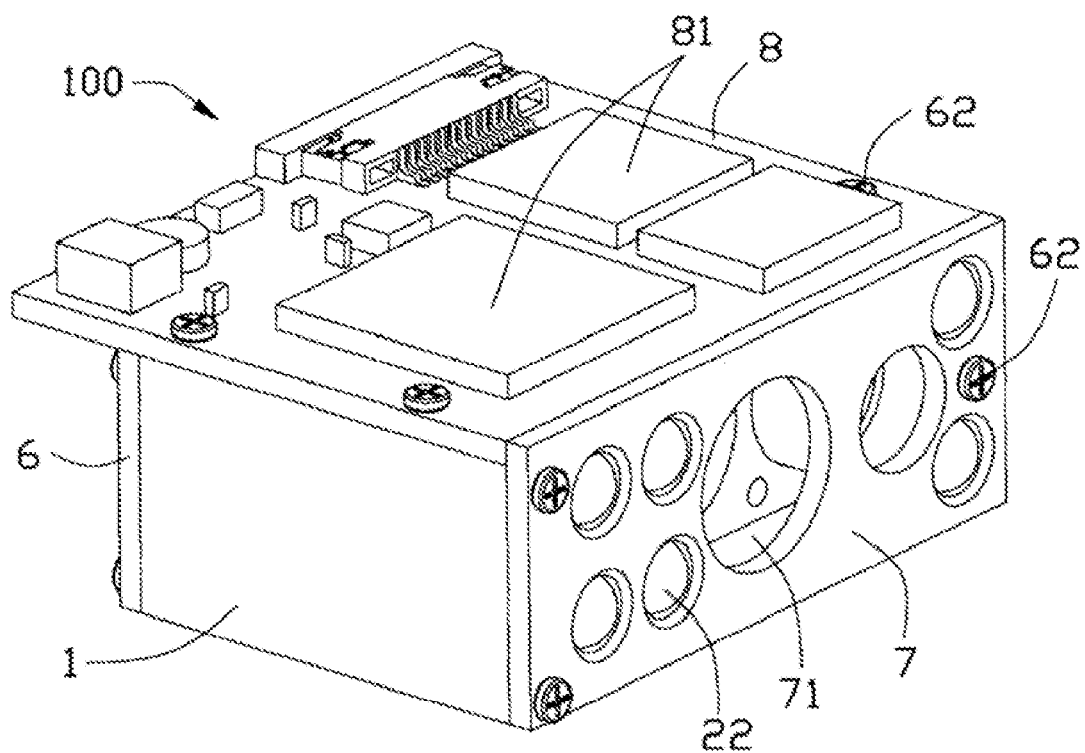
FIG. 1 is a perspective, assembled view of an imaging module according to the present invention.
Figure 2:
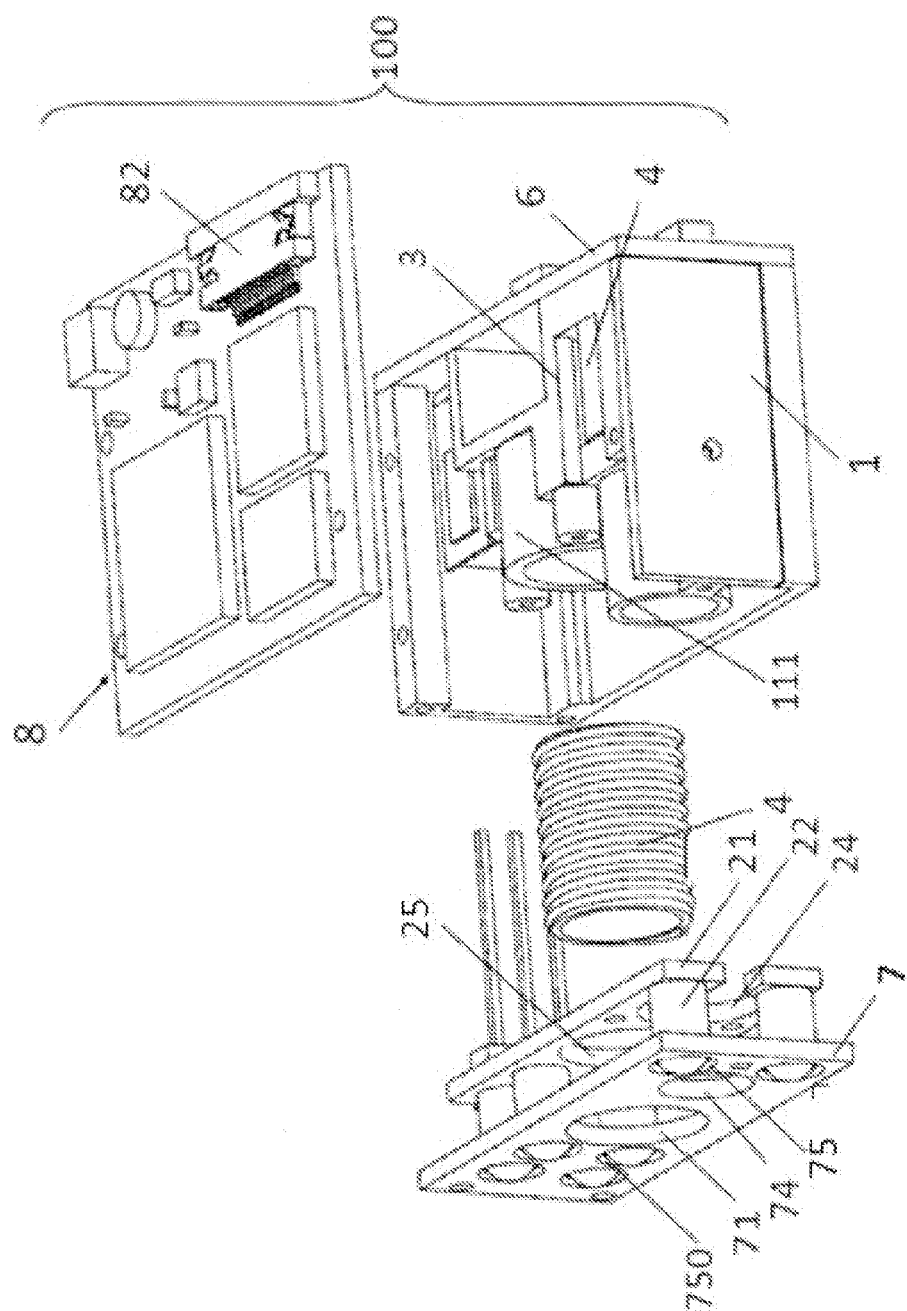
FIG. 2 is a partially exploded view of the imaging module shown in FIG. 1.

Reference will now be made to the drawing figures to describe the present invention in detail.

Figure 13:
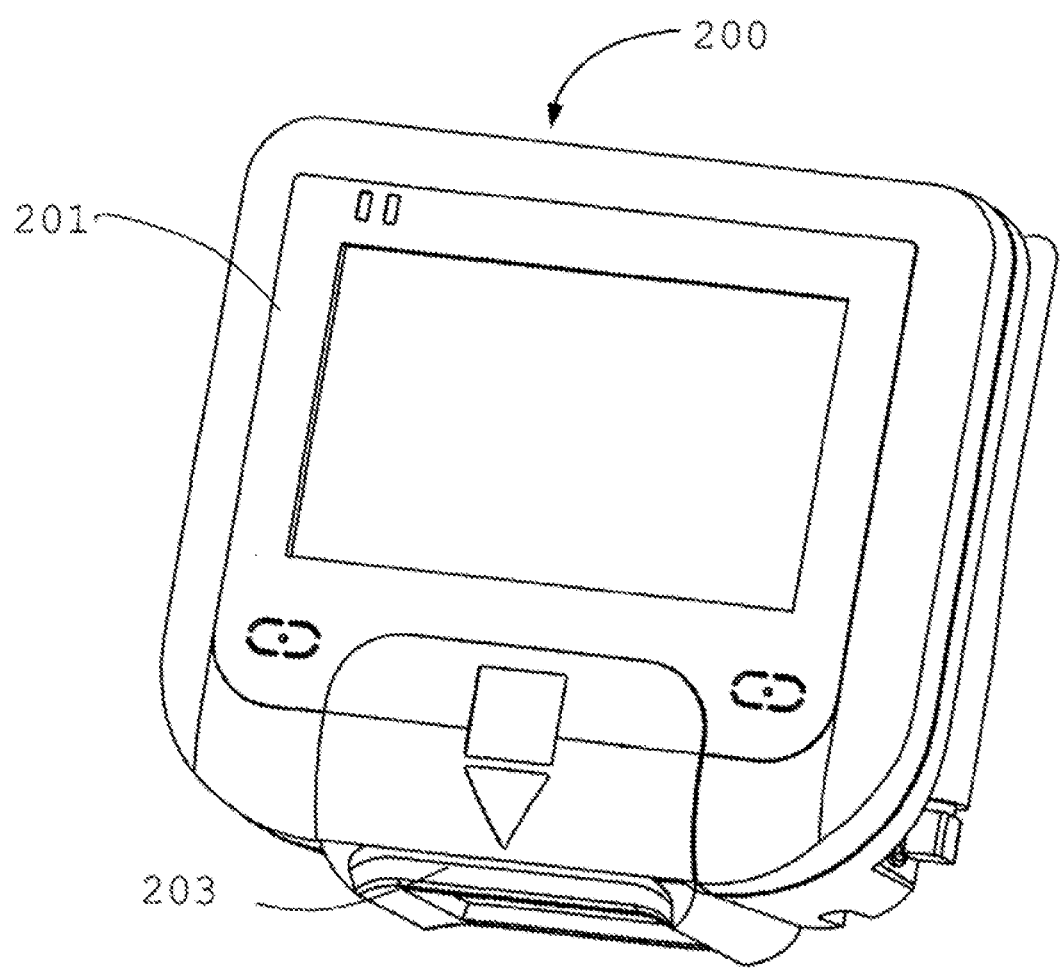
FIG. 13 shows an optical reader incorporated the imaging module of the present invention.
Figure 14:
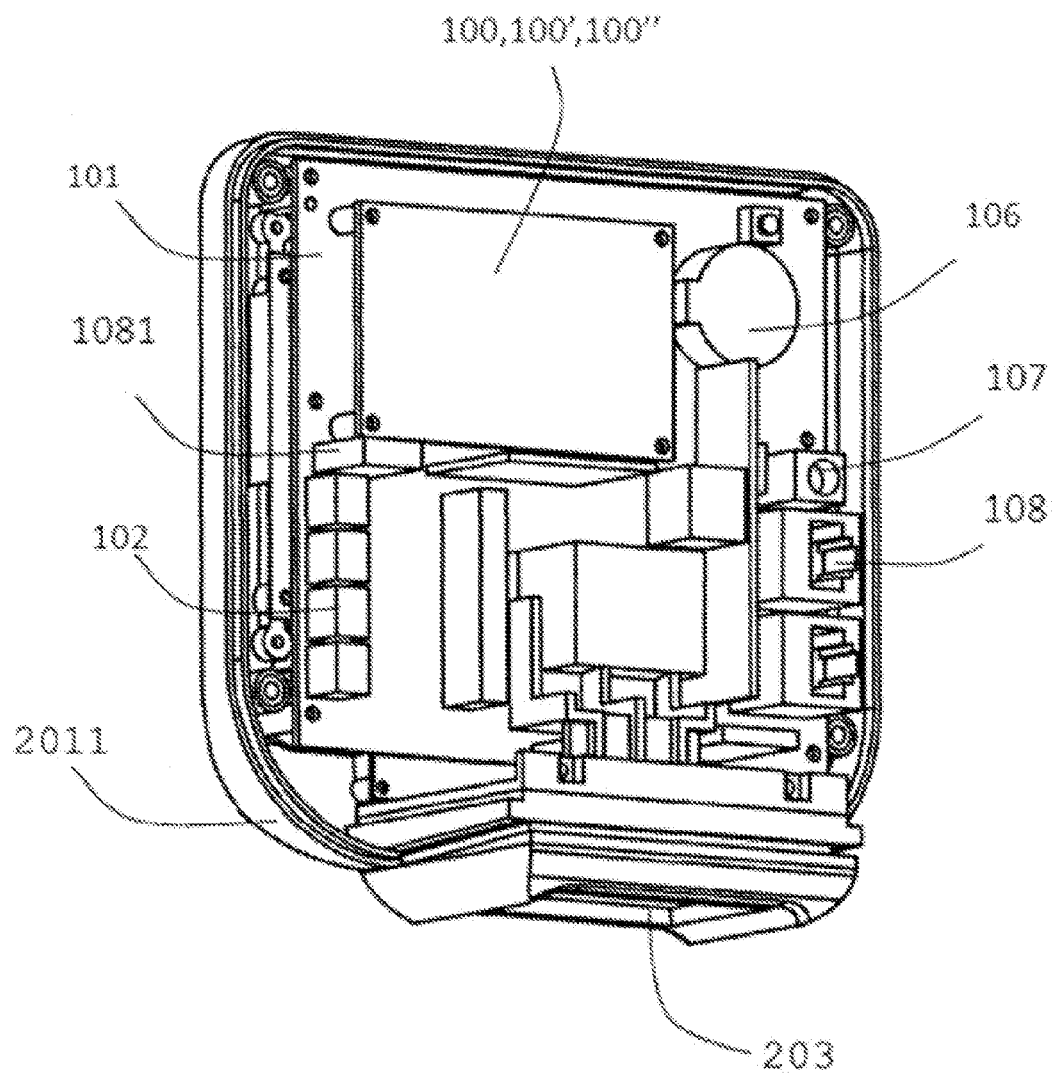
FIG. 14 is a partial perspective view of the optical reader shown in FIG. 13.
Figure 15:
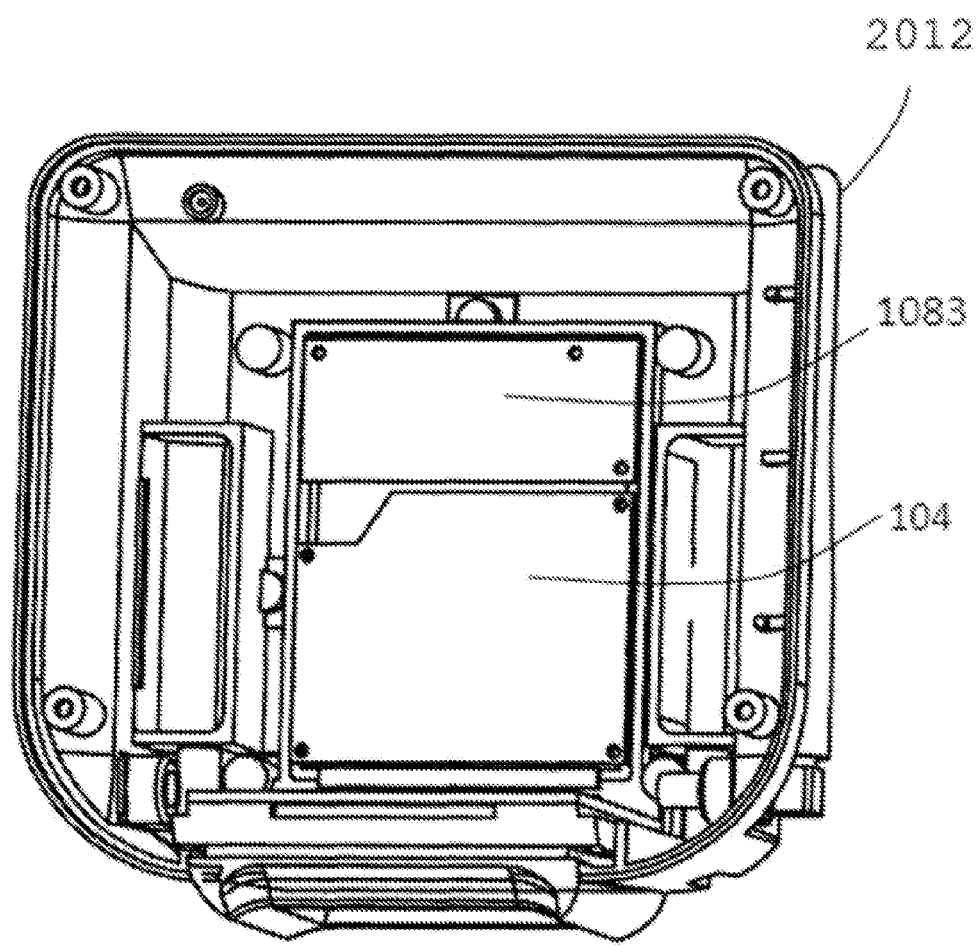
FIG. 15 is another partial perspective view of the optical reader shown in FIG. 13.
Figure 16:
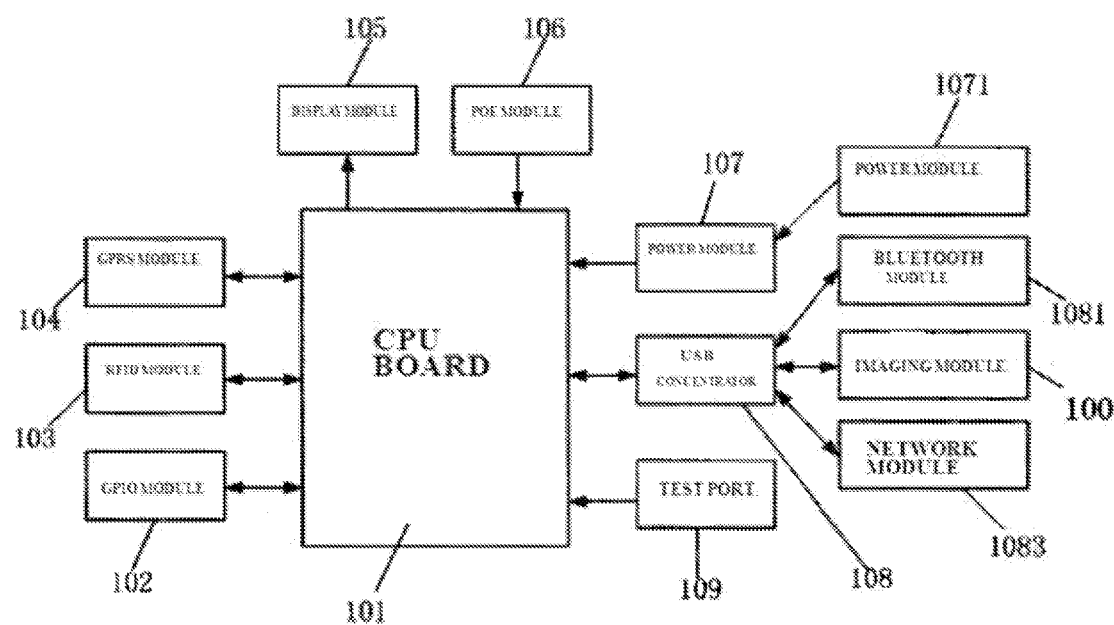
FIG. 16 is a block diagram illustrating the function features of the optical reader shown in FIG. 13.

An imaging module 100 of an optical reader 200 (FIG. 13) is shown in FIGS. 1-8 and 10. The imaging module 100 is an important element of the optical reader 200 and specially designed for use in an indicial reader such as a barcode reader, an optical character recognition (OCR) reader or in a reader having both barcode and OCR reading capabilities. However, it will be understood that features of imaging module 100 may also find use in other devise requiring image capture including video cameras, digital cameras, and medical viewing instruments.

Referring to FIGS. 1-6, the imaging module 100 according to a preferred embodiment of the present invention comprises a U-shaped mounting frame 1, a lighting source plate 2, a supporting frame 3, a scanning module 4, a lens 5, a first circuit board 6, a baffle plate 7 opposite to the first circuit board 6, and a second circuit board 8 assembled to a top end of the mounting frame 1. Although the mounting frame 1 disclosed herewith is integrated and configured to a U-shape, it also could be assembled by two separate parts, such as one is L-shape and the other is I-shape. The first circuit board 6 is a CMOS (Complementary Metal Oxide Semiconductor) circuit board and the second circuit board 8 is a decoding circuit board.

The mounting frame 1 has a horizontal bottom wall 11, a first and second sidewalls 12, 13 extending upwardly from the bottom wall 11. The first and second sidewalls 12, 13 have same height so that the top ends 15 thereof are located at a same level thereby facilitates to assemble the second circuit board 8. A receiving space 14 is formed between the first and second sidewalls 12, 13 for receiving the lighting source plate 2, the supporting frame 3, the scanning module 4, and the lens 5. The first sidewall 12 defines an elongated recess 120, a first protrusion 121 formed at a top end thereof and a second protrusion 122 formed at a bottom end thereof. A plurality of first mounting holes and a plurality of second mounting holes 123, 124 are defined on the first sidewall 12 and extend along different directions. The first mounting holes 123 are recessed from a top surface of the first sidewall 12 and the second mounting holes 124 are recessed from front and back surfaces of the first sidewall 12.

The mounting frame 1 of the present invention is a one-piece structure which not only reduces the number of the elements but also facilitates to assemble the imaging module 100. The mounting frame 1 also could be formed by separated bottom wall 11, first and second walls 12, 13.

A lens barrel 111 is formed on the bottom wall 11 and projects into the receiving space 14. The lens barrel 111 is a hollow cylinder and defines a through hole 112 extending in a front to back direction for receiving the lens 5. The lens barrel 111 is integratedly formed with the mounting frame 1 thereby reduces the elements of the imaging module 100 and provide an accurate position for the lens 5.

The lighting source plate 2 includes a flat plate portion 21, a plurality of illumination lights 22 and a plurality of mounting tails 23 electrically connected with the illumination lights 22. In this embodiment, there are six LEDs used as the illumination lights 22 which are arranged for providing sufficient lighting source. The illumination lights 22 project out of the plate portion 21. The mounting tails 23 extend through the supporting frame 3 and electrically connect with the first circuit board 6. In the current invention, the mounting tails 23 are soldered to the first circuit board 6. The plate portion 21 defines an opening 24 and a hole 25 aligned to the through hole 112 of the lens barrel 111.

Figure 4:
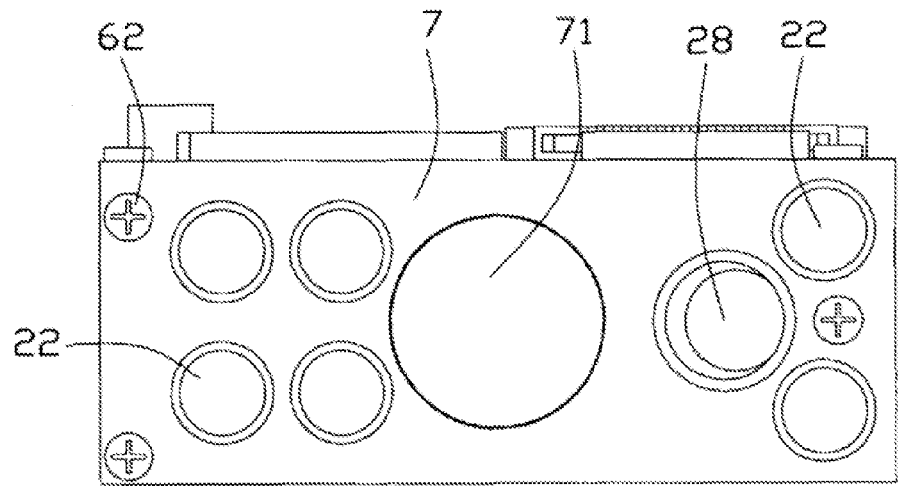
FIG. 4 is a front view of the imaging module shown in FIG. 1.

The supporting frame 3 is made of insulative materials and includes a base portion 31, two first posts 33 projecting out of a front surface 32 of the base portion 31, and a second post 34 adjacent to the first posts 33. Diameter of the second post 34 is bigger than that of the first posts 33. The first posts 33 engage with fasteners whereby secure the supporting frame 3 to the plate poriton 21. The second post 34 is longer than the first post 33 and passes through the opening 24 of the lighting source plate 2. A rib 341 is formed on the second post 34 and defines a mounting hole 342 at a front end thereof. The second post 34 defines a through hole 343 for receiving an aiming light 28 (as shown in FIG. 4). The aiming lights 28 and the illumination lights 22 have similar constructions and are all LEDs for reading barcode or image.

The aiming light 28 is electrically connected with the first circuit board 6 by soldering. The base portion 31 defines a passageway 321 recessed from the front surface 32 and located between the two first posts 33.

The scanning module 4 is formed in a column shape and comprises a base portion 14 with a bigger diameter and a shrink portion 42 with a smaller diameter. The base portion 14 is received in the passageway 321 of the supporting frame 3 and the shrink portion 42 is received in the through hole 112 of the lens barrel 111.

The lens 5 is attached to the through hole 112 of the lens barrel 111 and located in front of the scanning module 4.

When the imaging module 100 is working, such as scanning an image, illumination lights are emit to the image and reflected to the lens 5 thereby focus on the scanning module 4. Then the scanning module 4 transmits the signal to the second circuit board 8 for decoding.

Figure 5:
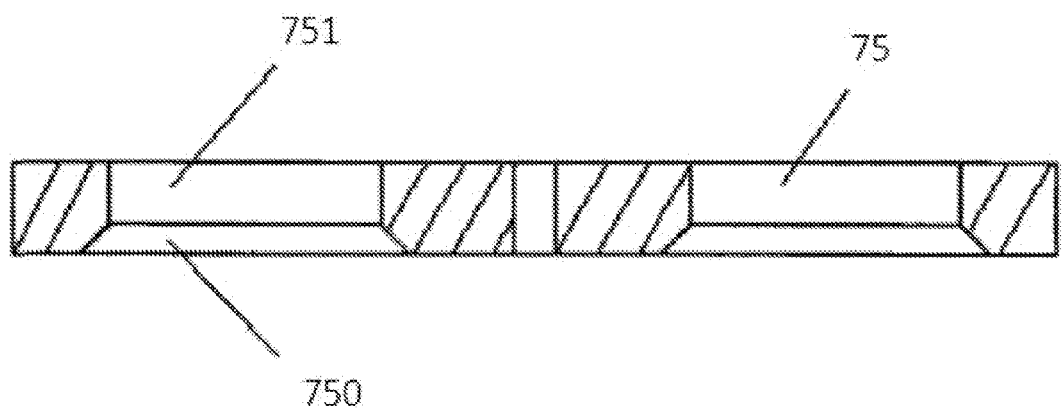
FIG. 5 is a cross-sectional view of a baffle plate of the imaging module shown in FIG. 1.
Figure 6:
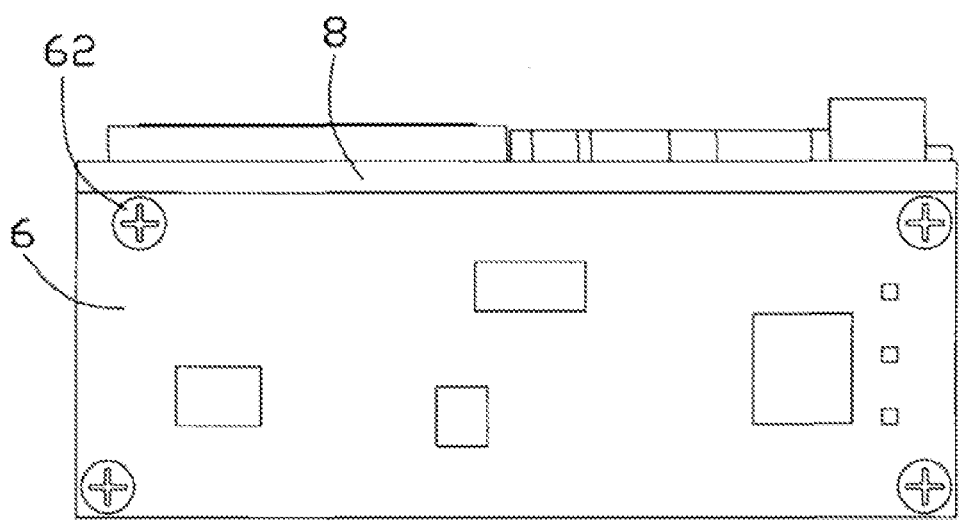
FIG. 6 is a back view of the imaging module.
Figure 7:
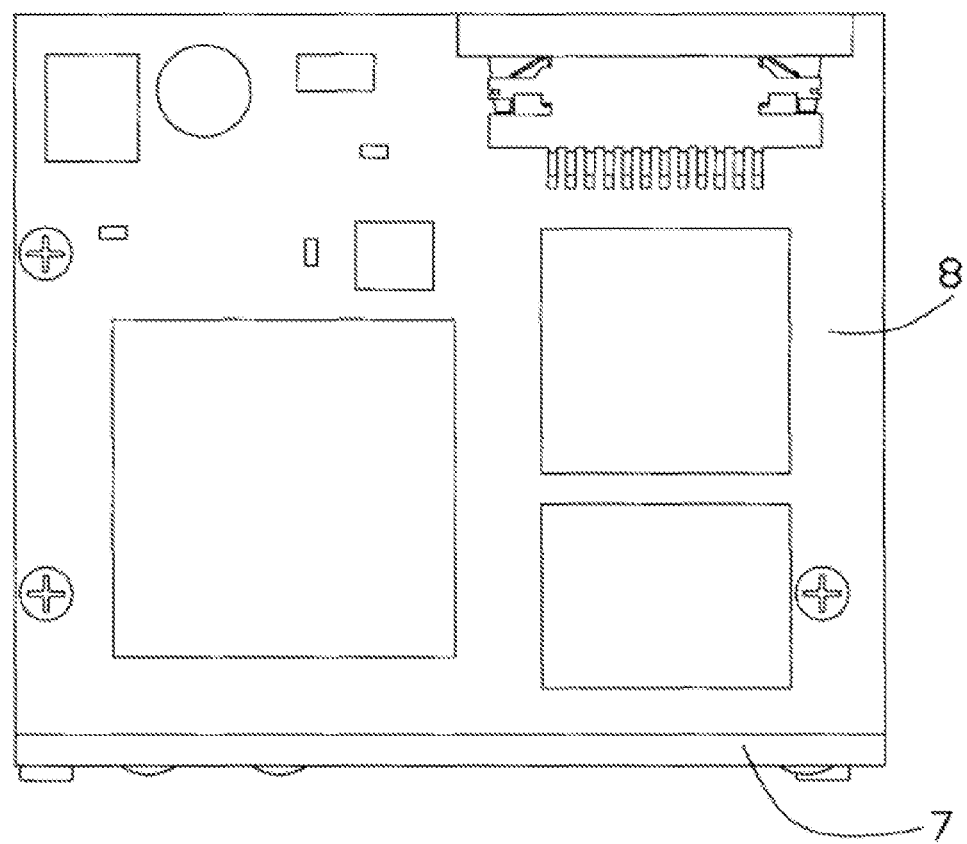
FIG. 7 is a top view of the imaging module.
Figure 8:
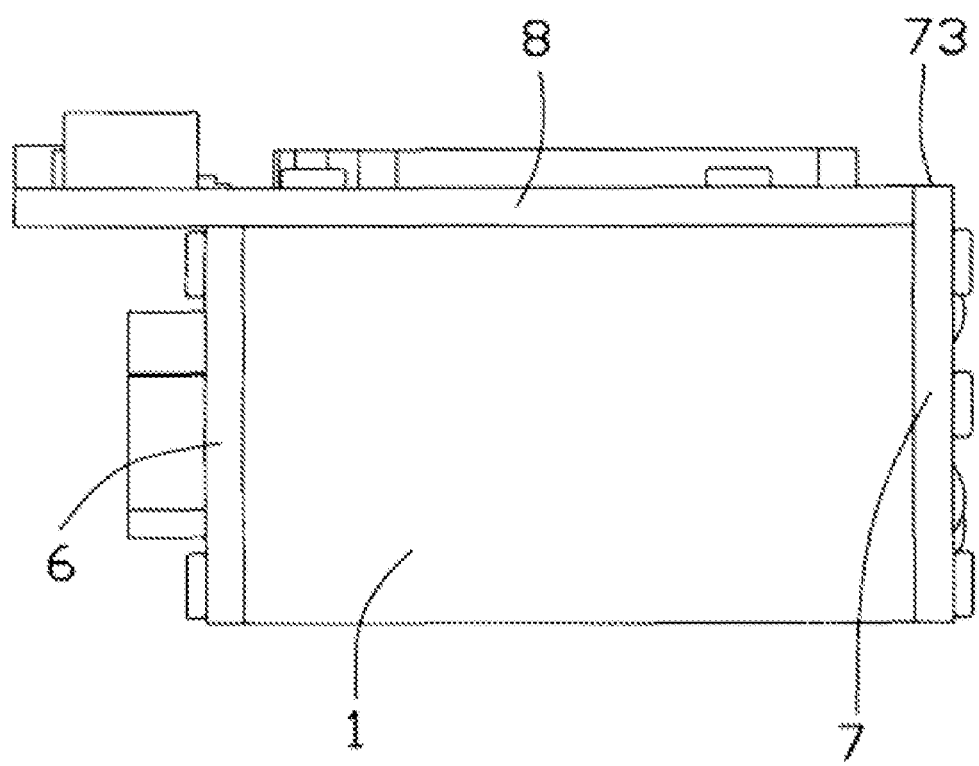
FIG. 8 is a side view of the imaging module.

The baffle plate 7 defines a lens hole 71, an aiming light hole 74, and a plurality of illumination holes 75. Especially, as shown in FIG. 5, each illumination hole 75 comprises a columnar passageway 751 extending forwardly from a back surface of the baffle plate 7 and a chamfer 750 communicated with the passageway 751. The chamfer 750 broadens the passageway 751 so that the light sources sent by the illumination lights 22 emit on the image as much as possible. The baffle plate 7 and the first circuit board 6 each defines a plurality of mounting holes 72, 61 corresponding to the second mounting holes 124 and engaged with fasteners 62 whereby secures the baffle plate 7 and the second circuit board 6 to opposite ends of the mounting frame 1. In other embodiments, the baffle plate 7 and the mounting frame 1 could be assembled together by hooks and cutouts. The fasteners 62 are screws in the current embodiment. The baffle plate 7 has a top surface 73.

The second circuit board 8 includes a decoding element 81 and a data transmit port 82. The first circuit board 6 is electrical connected with the second circuit board 8 via a flexible printed circuit mating with the data transmit port 82. Since the mounting frame 1 opens to an exterior at a top end thereof, the second circuit board 8 is arranged in the receiving space 14. The second circuit board 8 is not higher than the top surface 73 of the baffle plate 7 (shown in FIG. 8) so that the vacuum of the imaging module 100 can be further reduced.

Figure 3:
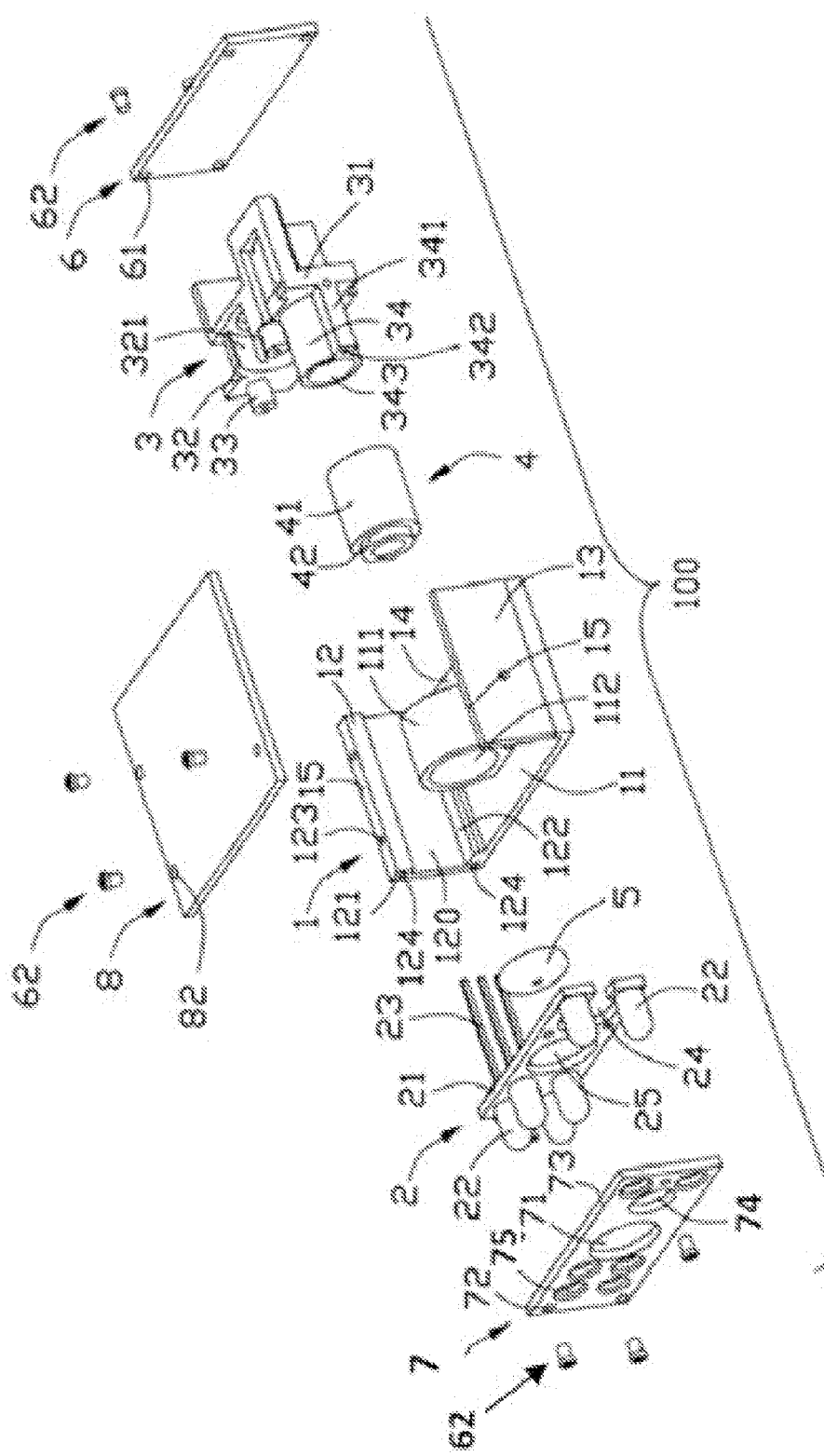
FIG. 3 is an exploded view of the imaging module shown in FIG. 1.

With reference to FIG. 3, the second circuit board 8 defines a plurality of holes 82 at peripheral thereof corresponding to the first mounting hole 123 so that the fasteners 62 pass therethrough and secure the second circuit board 8 to the mounting frame 1. In the imaging module 100, the second circuit board 8 can process and decode the image and the rest portion under the second circuit board 8 forms an image capture element to capture image. Therefore, the imaging module 100 of the present invention can capture image and decode simultaneously.

Figure 9:
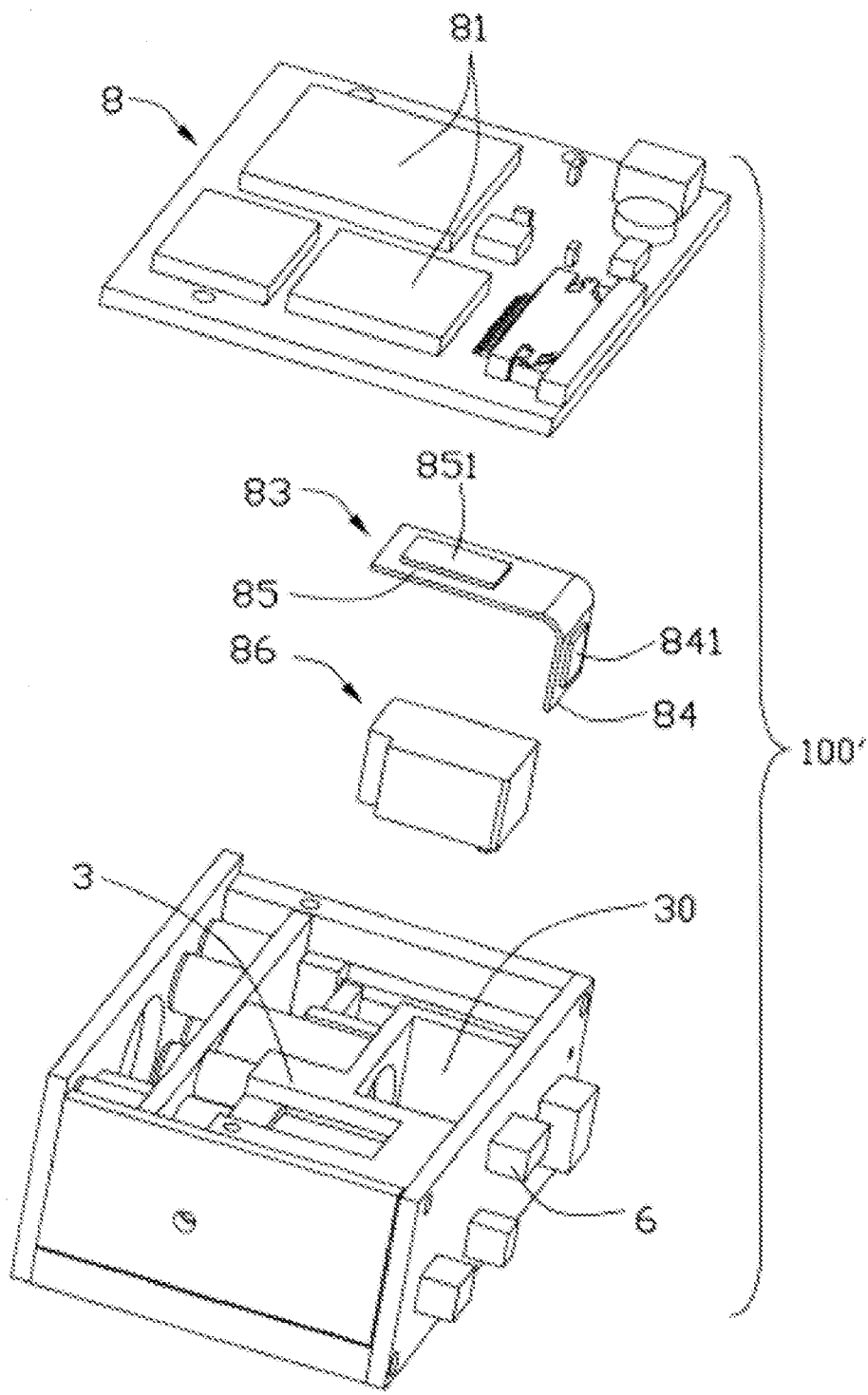
FIG. 9 is a partially exploded view of an imaging module according to a second embodiment of the present invention.

FIG. 9 illustrates an imaging module 100' in accordance with a second embodiment of the present invention. The imaging module 100' is most like the first embodiment except the positioning means of the second circuit board 8. The positioning means is an L-shaped connection member 83 which includes a vertical first tab 84 and a horizontal second tab 85 perpendicular to the first tab 84. The first and second tabs 84, 85 each have an adhesive 841, 851 for fixing the first and second circuit boards 6, 8 together. The supporting frame 3 defines a cavity 30 and the imaging module 100' has a supporting block 86 received in the cavity 30 for pressing the first and second tabs 84, 85.

Figure 10:
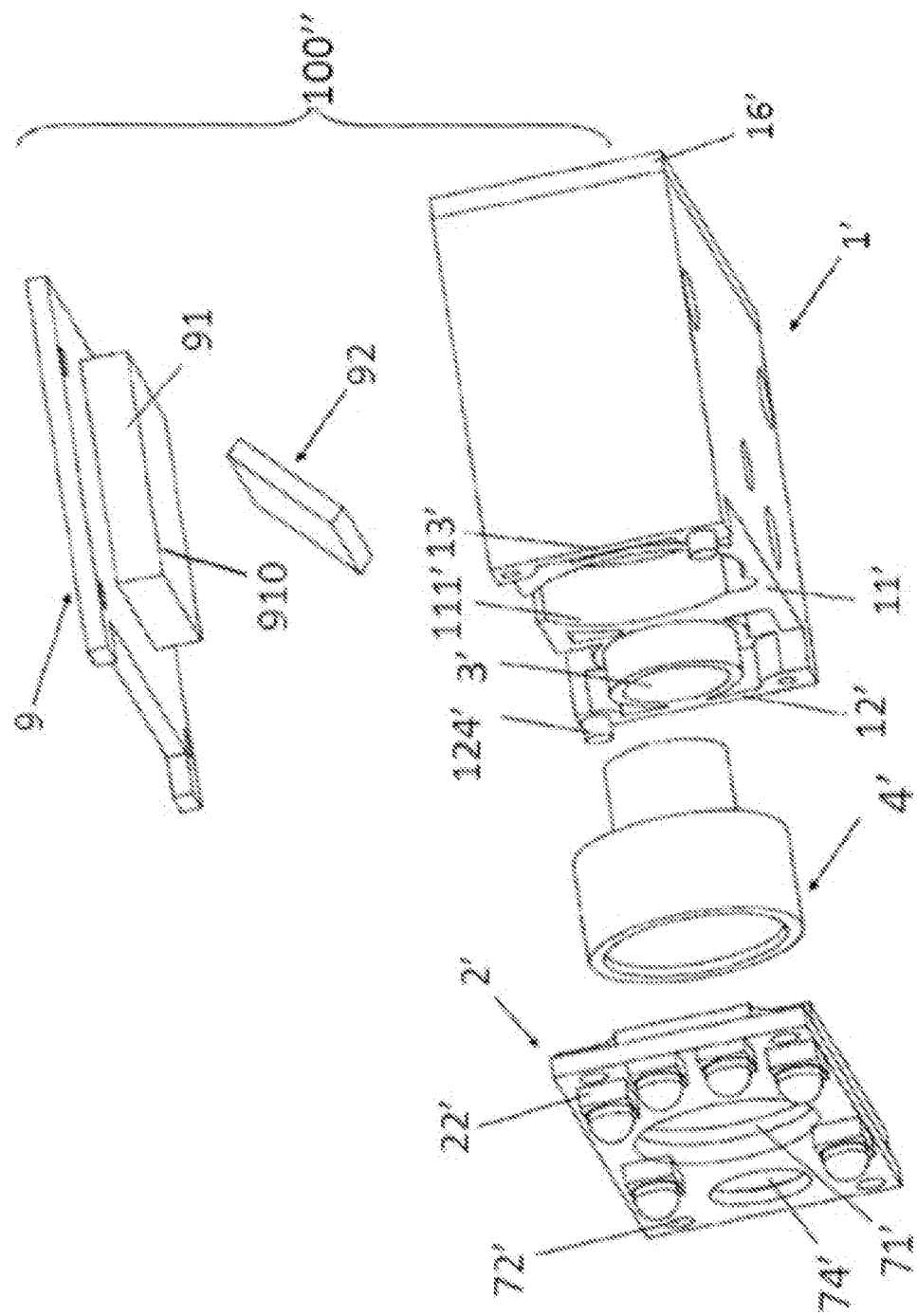
FIG. 10 is a partially exploded view of an imaging module according to a third embodiment of the present invention.
Figure 11:
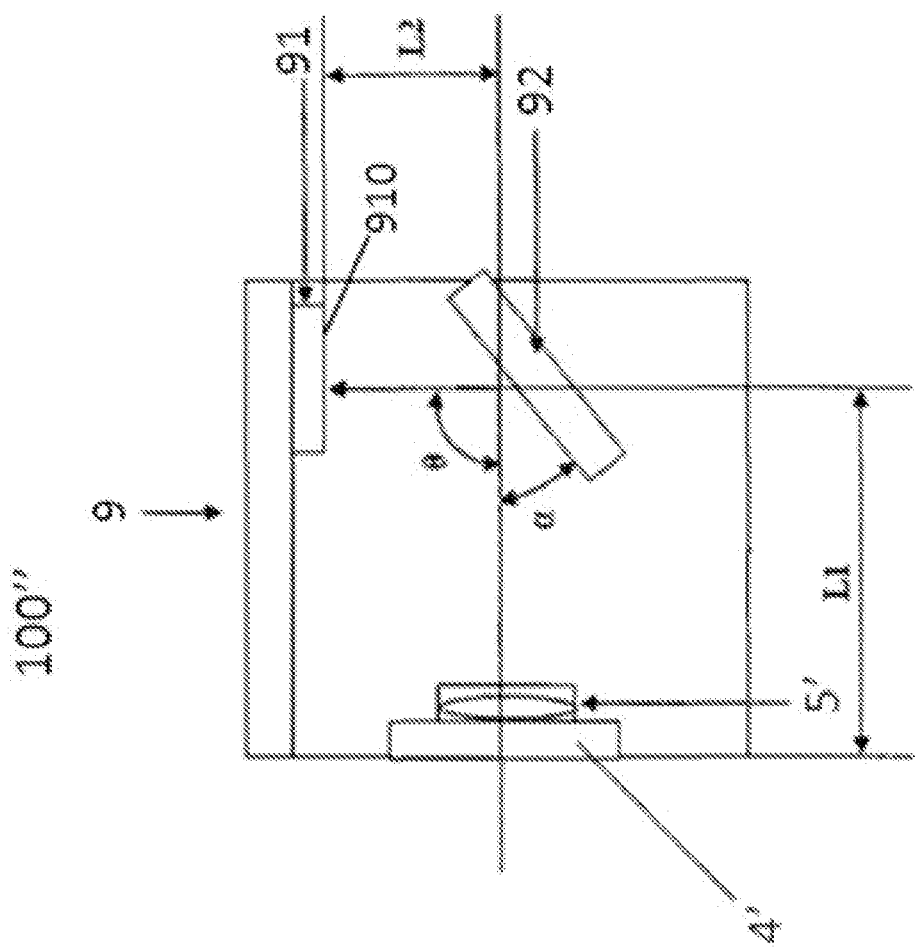
FIG. 11 illustrates the behavior of light entering and exiting the imaging module shown in FIG. 10.
Figure 11:
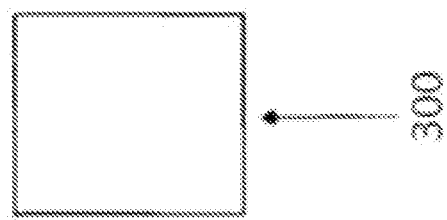

FIGS. 10-11 shows an imaging module 100" according to a third embodiment which includes a mounting frame 1', a lens barrel 111', a supporting frame 3', a lens module 5' received in the lens barrel 111', an aiming light (not shown) received in the supporting frame 3', a lighting source plate 2' with a plurality of illumination lights 22', a decoding circuit board 9 with an image sensor 91, and a reflecting glass 92 located between the lens module 4' and the image sensor 91 for reducing the horizontal travel of the incident light.

The lighting source plate 2' defines a lens hole 71', an aiming light hole 74', and a plurality of mounting holes 72' for engaging with screws and securing the lighting source plate 2' on the mounting frame 1'. The mounting frame 1' has a bottom wall 11' and opposite first and second sidewalls 12', 13' extending upwardly from the bottom wall 11' thereby forms a U-shaped structure. A back plate 16' is mounted to a rear end of the mounting frame 1'. The image sensor 91 and decoding circuit are both arranged on the decoding circuit board 9 rather than on two different circuit boards can decrease the vacuum of the imaging module 100' and simplify the manufacturing process thereof.

The reflecting glass 92 is located between a sensitive surface 910 of the image sensor 91 and the lens 5' with a certain angle. The lens module 4' has a lens 5'. An angle between a vertical axis of the sensitive surface 910 and an axis of the lens module 4' is labeled θ and the range of θ is 80°~100°. An angle between the reflecting glass 92 and the axis of the lens module 4' is labeled α and the range of α is 40°~50°. Barcode or image 300 passes through the lens 5' and is reflected by the reflecting glass 92, then appears on the sensitive surface 910 of the image sensor 91. The image sensor 91 translates the imaging into digital signal and transmits it to the decoding circuit (not shown) on the decoding circuit board 9. The distance between the lens 5' and the reflecting glass 92 is labeled L1, and the distance between the reflecting glass 92 and the sensitive surface 910 is labeled L2. The travel of the incident ray is labeled L, and L=L1+L2. Because the reflecting glass 92 is disposed between the lens 5' and the image sensor 91, the horizontal distance is reduce with L2 so that the horizontal size of the imaging module 100" is reduced accordingly.

Figure 12:
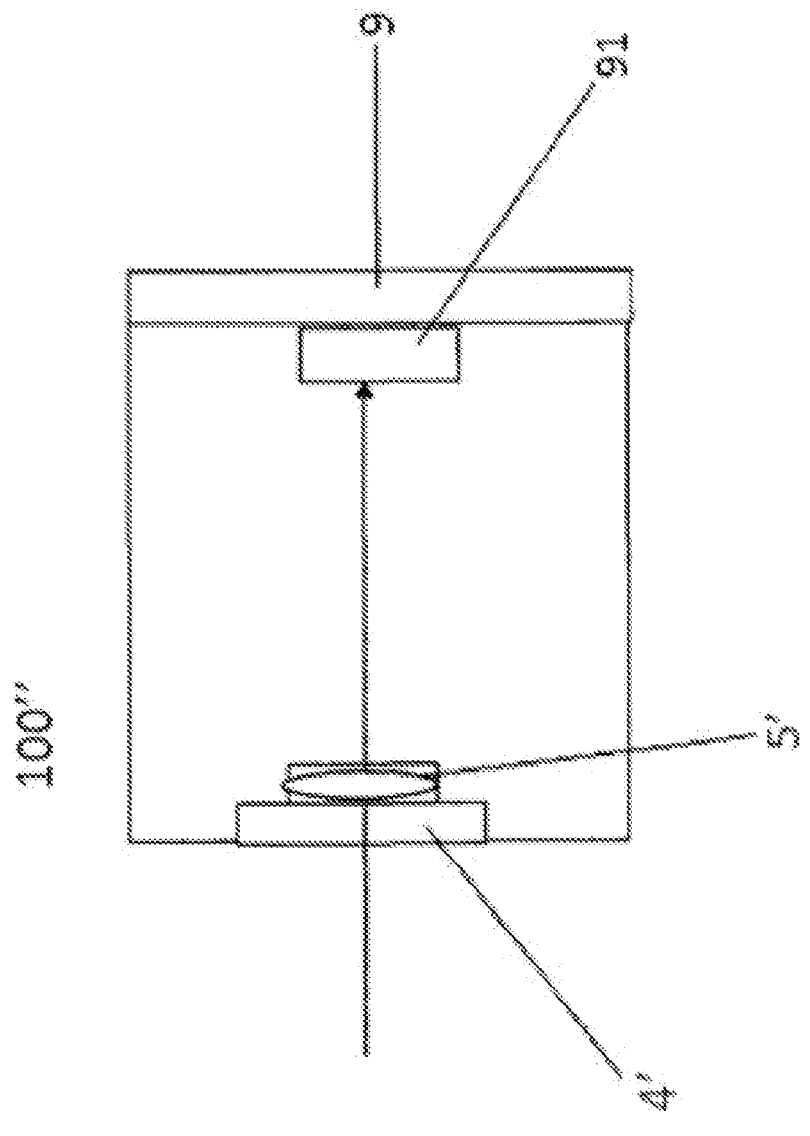
FIG. 12 illustrates an alternative embodiment according to the present invention.

Turn to FIG. 12, which shows an alternative embodiment which is similar to FIG. 12 except the imaging module 100" doesn't have reflecting glass. The Barcode or image 300 passes through the lens 5' and appears on the sensitive surface 910 of the image sensor 91 directly which also can reduce the size of the imaging module by arranging the image sensor 91 on the decoding circuit board 9. The image sensor 91 translates the imaging into digital signal and transmits it to the decoding circuit (not shown) on the decoding circuit board 9.

FIGS. 13-16 illustrate an optical reader 200 incorporated the imaging module 100, 100', 100". The optical reader 200 includes a case 201, a CPU board 101 located in the case 201, and a reading window 203 electrical connected with the CPU board 101. The case 201 has a first section 2011 and a second section 2012 latched with each other. The optical reader 200 further comprises a display module 105 electrical connected with the CPU board 101 and receiving the output signals of the products, a POE module 106 electrical connected with the CPU board 101 and providing power for the CPU board 101, a power module 107 for providing power for the CPU board 101, and a power port 1071. Functional module such as RFID module 103, GPRS module 104, GPIO module 102 and the POE module 106 et al. can electrical connect with the CPU board 101 selectively and communicate with the CPU board 101. The CPU board 101 can provide power for these functional modules and control these functional modules to process commands. The optical reader 200 comprises test port 109 electrical connected with the CPU board 101 for testing the CPU board and other functional modules.

The power port 1071 is electrical connected with an external power adapter (not shown) and the power adapter is preferred to input 12V so that the power port 1071 translate to 5V or 3.3V desired by the optical reader 200. The CPU board 101 is provided with a USB concentrator 108 which can electrical connect a Bluetooth module 1081 or a network module 1083 with the CPU board 101 selectively and provides power for them. The network module 1083 can be a RJ45 network module or a wireless WIFI network module. In the embodiment herewith, the network module 1083 is a wireless WIFI network module. In addition, the USB concentrator 108 is also used to electrical connect the imaging module 100, 100', 100" to the CPU board 101 detachably and provide power for the imaging module 100, 100', 100". The GPIO module 102 has two input and two output interactive signals used for indicator lights, access control systems, or buzzer et al. The RFID module 103 is applied to non-contact IC card read/record for 13.56 MHz. The GPRS module 104 can communicate with external under GPRS wireless network. The RFID module 103, the GPRS module 104, the network module 1083, and the Bluetooth module 1081 can be called communicating module of the optical reader 200.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. An imaging module for an optical reader, comprising:
   a mounting frame having a bottom wall, a first sidewall and a second sidewall located at opposite sides of the bottom wall, the first and second walls defining a receiving space which opens at a top end thereof;
   a scanning module located in the receiving space;

a lens located in front of the scanning module;
a plurality of illumination lights located in the receiving space;
a first circuit board electrically connecting to the illumination lights and assembled to said mounting frame; and
a second circuit board having a decoding element, said second circuit board electrically connecting with the first circuit board and covering the top end of the receiving space.

2. The imaging module as claimed in claim 1, wherein said first circuit board is disposed perpendicularly to said second circuit board.

3. The imaging module as claimed in claim 1, wherein the first circuit board is a CMOS (Complementary Metal Oxide Semiconductor) circuit board.

4. The imaging module as claimed in claim 3, further comprising a plurality of fasteners, wherein the second circuit board and the mounting frame each defines a plurality of mounting holes engaged with fasteners thereby securing the second circuit board to the mounting frame.

5. The imaging module as claimed in claim 1, wherein the mounting frame has a lens barrel integratedly formed on the bottom wall, and wherein the scanning module and the lens are assembled to said lens barrel.

6. The imaging module as claimed in claim 1, further comprising a supporting frame located in the receiving space and a lighting source plate having the illumination lights disposed thereon, wherein each of the illumination lights has mounting tails passing through the supporting frame and electrically and mechanically connecting to the first circuit board.

7. The imaging module as claimed in claim 1, further comprising an aiming light disposed adjacent to the illumination lights and electrically connected with the first circuit board.

8. The imaging module as claimed in claim 7, further comprising a baffle plate assembled on the mounting frame at an opposite side to the first circuit board and defining a lens hole corresponding to the lens, an aiming light hole corresponding to the aiming light, and a plurality of illumination holes for the illumination lights passing through.

9. The imaging module as claimed in claim 8, wherein each illumination hole comprises a columnar passageway extending forwardly from a back surface of the baffle plate, and wherein a chamfer is defined at the passageway.

10. The imaging module as claimed in claim 1, further comprising an L-shaped connection member, wherein the second circuit board is mechanically connected with the first circuit board by said L-shaped connection member.

11. The imaging module as claimed in claim 1, wherein said second circuit board has at least one imaging sensor attached thereon.

12. An optical reader, comprising:
a Central Processing Unit (CPU),
an imaging module electrically connected with said CPU;
a power module electrically connected with the CPU and providing power for the imaging module; and
a case shielding the CPU, the imaging module and the power module; wherein
the imaging module comprising a mounting frame having a bottom wall, a first sidewall and a second sidewall located at opposite sides of the bottom wall, the first and second walls defining a receiving space which opens at a top end thereof;
a scanning module located in the receiving space;
a lens located in front of the scanning module;
a plurality of illumination lights located in the receiving space;
a first circuit board electrically connected with the illumination lights; and
a second circuit board electrically and mechanically connecting with the first circuit board, said second circuit board having a decoding element thereon and covering the top end of the receiving space.

13. The optical reader as claimed in claim 12, further comprising a Power Over Ethernet module, a Universal Serial Bus concentrator, and a Bluetooth module electrically connected with the CPU, respectively.

14. The optical reader as claimed in claim 12, wherein the first circuit board is a Complementary Metal Oxide Semiconductor (CMOS) circuit board and the second circuit board is mounted to the mounting frame.

15. The optical reader as claimed in claim 14, further comprising a plurality of fasteners, wherein the second circuit board and the mounting frame each defines a plurality of mounting holes engaged with fasteners thereby securing the second circuit board to the mounting frame.

16. The optical reader as claimed in claim 12, wherein the mounting frame includes a lens barrel integratedly formed on the bottom wall thereof and the scanning module and the lens are received in the lens barrel.

17. The optical reader as claimed in claim 12, wherein the imaging module comprises a baffle plate opposite to the first circuit board and defining a lens hole corresponding to the lens and a plurality of illumination holes for the illumination lights passing through; and wherein each illumination hole comprises a columnar passageway extending forwardly from a back surface of the baffle plate and a chamfer formed on said passageway.

* * * * *